United States Patent [19]
Hurt

[11] 3,788,430
[45] Jan. 29, 1974

[54] DISC BRAKE ACTUATOR

[75] Inventor: Harmon C. Hurt, Dayton, Ohio

[73] Assignee: General Motors Corporation, Detroit, Mich.

[22] Filed: Aug. 17, 1971

[21] Appl. No.: 172,400

[52] U.S. Cl............. 188/72.6, 74/89.15, 188/71.9, 188/72.8, 188/106 F, 192/93 R, 192/94

[51] Int. Cl............................................ F16d 55/26

[58] Field of Search..... 188/106 F, 72.4, 72.6, 72.7, 188/72.8, 72.9, 71.9, 196 B, 196 BA, 72.5; 192/94, 96, 93 R; 74/89.14, 89.15

[56] References Cited
UNITED STATES PATENTS

| | | | |
|---|---|---|---|
| 3,459,282 | 8/1969 | Hoenick et al. | 188/196 R X |
| 2,612,968 | 10/1952 | Hood | 188/72.8 X |
| 3,653,470 | 4/1972 | Travis | 188/71.9 |

*Primary Examiner*—George E. A. Halvosa
*Attorney, Agent, or Firm*—D. D. McGraw

[57] ABSTRACT

A hydraulically actuated disc brake includes a piston movable in a cylinder by hydraulic pressure. The brake also has a mechanically actuated mechanism which includes an expandable spline plate fitted within the piston and actuated by a cam to engage a spline on the interior of the plate. After such engagement, further movement of the mechanical actuating lever acts through a high lead screw arrangement to move the cam and the spline plate and the piston in a direction to mechanically apply the brake. Upon release, the interior splines retract radially to de-clutch from the piston.

1 Claim, 3 Drawing Figures

PATENTED JAN 29 1974 3,788,430

INVENTOR.
Harmon C. Hurt
BY
D.D. McGraw
ATTORNEY

DISC BRAKE ACTUATOR

The invention relates to a disc brake actuator and more particularly to one having a service brake operating arrangement involving a hydraulic system and a second brake operating arrangement which is actuated mechanically. The secondary brake arrangement may be utilized for parking brake purposes. The mechanism for mechanically actuating the brake is adapted to a disc brake wheel cylinder arrangement so that it acts on the wheel cylinder piston to move the piston in the same direction as it is moved during hydraulic actuation. The device includes a rotatable cam which acts to expand radially outward elements of a spline plate, which then engage a mating spline on the interior of the piston. Further radial movement of the apply mechanism then causes a high lead screw to move the cam and spline plate and piston in the brake engaging direction. Upon movement of the mechanical apply mechanism to the brake release position, the spline plate elements are retracted radially inward to disengage the piston spline. The high lead screw also retracts, and the brake piston is returned to the release position.

IN THE DRAWING

Figure 1:
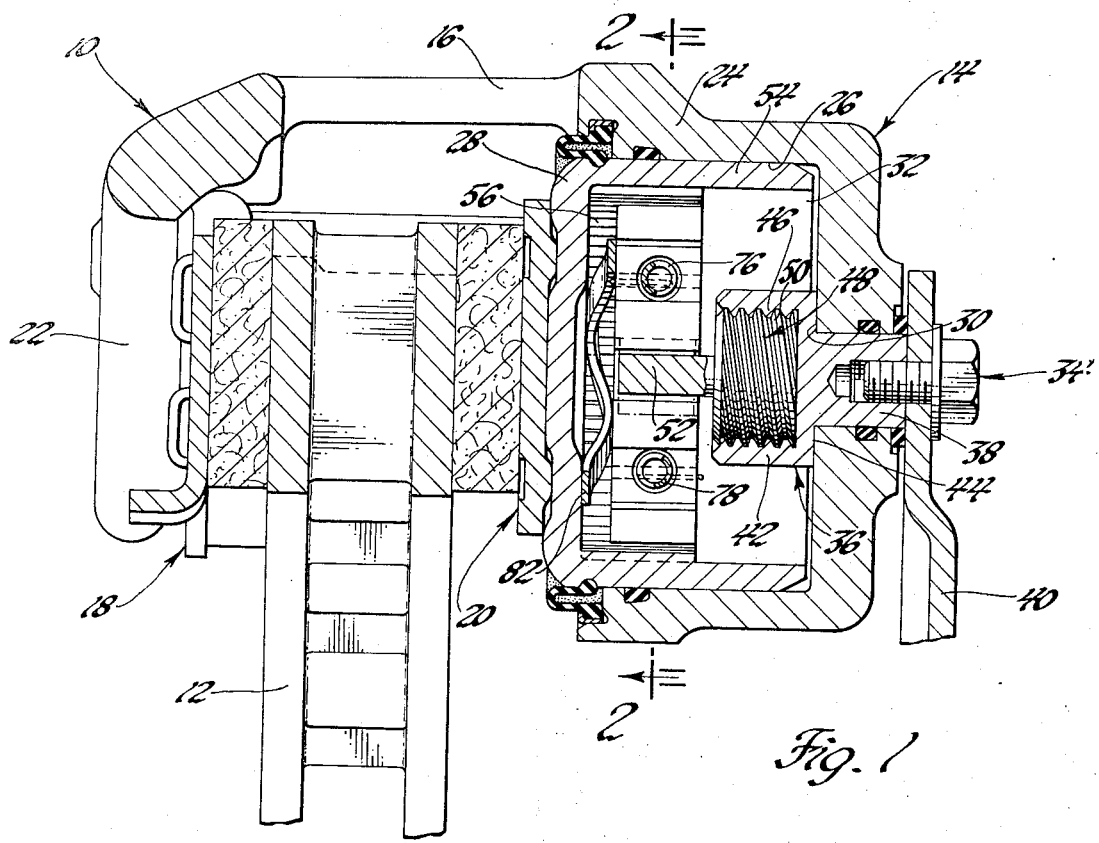
FIG. 1 is a cross section view of a disc brake embodying the invention, with parts broken away and in section.

The disc brake assembly 10 includes a disc 12 normally attached to a rotatable member such as a vehicle wheel. The caliper assembly 14 includes a caliper frame 16 which is generally U-shaped and extends over the brake periphery so as to support the brake shoe assemblies 18 and 20 on opposite sides of the disc for engagement with the disc friction braking surfaces. The caliper leg 22 supports the brake shoe assembly 18. The caliper leg 24 includes a portion formed to provide a cylinder 26 in which is mounted, for reciprocal movement, the piston 28. Brake shoe assembly 20 is positioned in the caliper assembly so that when piston 28 is moved toward the disc 12 the shoe assembly frictionally engages one side of the disc. At the same time, the caliper frame 16 is moved in the opposite direction relative to the piston because of hydraulic reaction on the area of cylinder base 30, thus moving caliper leg 22 and the brake shoe assembly 18 so that the shoe assembly engages the other frictional braking surface of disc 12. Hydraulic brake operating pressure is suitably provided in the pressure chamber 32, formed by cylinder 26, piston 28, and cylinder base 30.

In order to actuate the brake mechanism so that it may be, for example, used as a parking brake, a mechanical brake actuating assembly 34 is provided. In this assembly a plug 36 is sealingly and rotatably mounted so that it extends through the cylinder base 30 with its outer end 38 suitably attached to an arm 40. The arm 40 may be attached to any suitable brake operating element, such as a pedal or hand lever, as is well known in the art, so that the arm may be rotated through an arc to apply the parking brake.

The plug inner end 42 is headed to provide a shoulder 44 which engages the cylinder base 30 in bearing relationship. In some installations, a bearing may be desirable at this point. The plug head forming plug inner end 42 is recessed and provided with internal high lead screw threads 46. A high lead screw assembly 48 includes one end section on which high lead screw threads 50 are formed. This section is in meshing engagement with the high lead screw threads 46. The outer end of high lead screw assembly 48 extends toward piston 28 and is formed to provide a generally S-shaped actuating cam 52. The shape of this cam is better seen in FIGS. 2 and 3.

Figure 2:
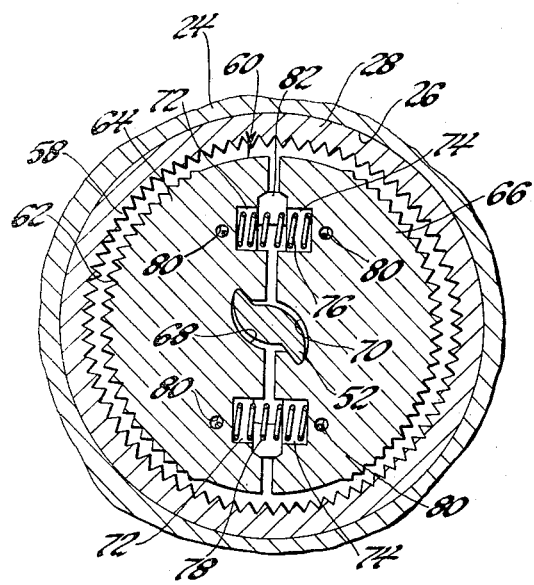
FIG. 2 is a cross section view of the spline arrangement used in the brake of FIG. 1, showing the spline clutch in the released position.

The skirt 54 of piston 28 is provided with an outer spline 56. The spline is illustrated as being formed of internal teeth 58 spaced circumferentially about the interior of the piston skirt 54. The spline plate 60 provides the inner spline of the spline clutching unit. The spline plate has teeth 62 formed on the circumferentially outer surface thereof and so arranged that they can be engaged with and disengaged from the teeth 58 in the manner described below. The spline plate is divided radially into a plurality of spline sections, two such sections 64 and 66 being illustrated and usually being all that are necessary for operation of the device. When two such sections are provided, the division of the spline plate is along a diameter, as illustrated in FIGS. 2 and 3.

At the center of the spline plate cam surfaces 68 and 70 are respectively provided on spline sections 64 and 66 so as to cooperate with actuating cam 52. Opposed recesses 72 and 74 are respectively provided in the spline sections on either side of the cam surfaces 68 and 70 so as to receive tension springs 76 and 78 therein. Suitable apertures 80 are provided adjacent the recesses 72 and 74 so that the ends of the springs 76 and 78 can be hooked therein and act on the spline sections to urge them radially inward. When the cam 52 is in the position shown in FIG. 2, the spline sections 64 and 66 are held sufficiently inward radially to give complete radial and circumferential clearance between the teeth 62 and the teeth 58. This is the de-clutched position.

Figure 3:
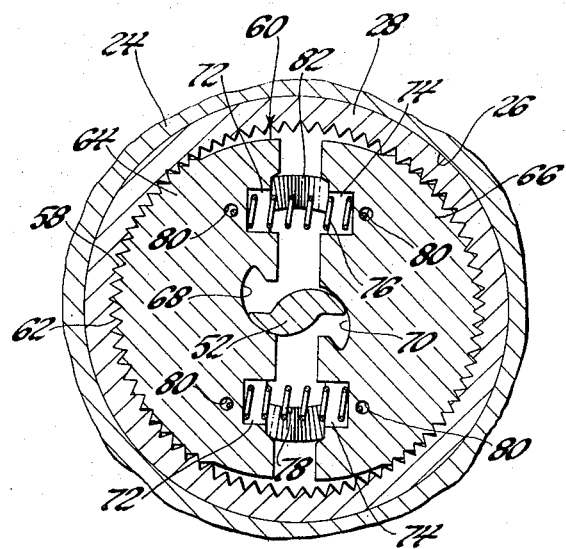
FIG. 3 is similar to FIG. 2 but shows the spline clutch in the engaged position.

When the actuating cam 52 has been rotated, by movement of the arm 40, to the position shown in FIG. 3, it moves the spline sections 64 and 66 radially outward against the forces of springs 76 and 78 so that teeth 58 and 62 are engaged in meshing relation and the spline plate is clutched to the piston 28. A wavy washer 82 is positioned between the spline plate 60 and the interior surface of the piston head so as to cushion brake action through the mechanical actuating assembly 34 and to provide for a return of the high lead screw 48 upon brake release.

In normal service braking operation by the hydraulically actuated system, brake fluid under pressure is exerted in chamber 32, moving piston 28 leftwardly and caliper frame 68 rightwardly to bring the brake shoe assemblies 18 and 20 into friction braking engagement with the disc 12. When the brake is actuated by the mechanical brake actuating assembly 34, arm 40 is rotated, causing actuating cam 52 to rotate counterclockwise, as seen in FIG. 2, to move the spline sections 64, 66 radially outward, thus clutching the spline plate 60 to the piston 28. Further rotational movement of arm 40 causes the high lead screw assembly 48 to be forced outward of the high lead threads 46 moving the screw assembly, including actuating cam 52, in a brake engaging direction, and moving with it the spline plate 60.

Slight compression of the wavy washer 82 may occur. Continued movement of arm 40 acts through the mechanical connection just described to move piston 28 and through the brake shoe assembly 20 so that the brake shoe assembly engages disc 12. Reaction through the shoulder 44 and the cylinder base 30 causes the caliper frame to move in the opposite direction, frictionally engaging brake shoe assembly 18 with the disc 12, actuating the brake.

When the arm 40 is returned in the other direction for brake release, the high lead screw assembly is moved away from the disc 12, taking with it spline plate 60 and the piston 28, until there is insufficient clutching force to hold the spline plate in engagement with piston 28 in an axial force transmitting manner. Cam 52 then rotates counterclockwise, as seen in FIG. 3, and with cam action and the force of the springs 76 and 78, the spline sections 64 and 66 are moved radially inward to disengage the spline plate from the piston.

What is claimed is:

1. A disc brake actuator comprising:

hydraulic pressure actuating means including a cylinder having a piston slidably movable therein and cooperating therewith to form a pressure chamber, mechanical actuating means including a rotatable plug extending into the pressure chamber through the base of the cylinder and having an arm on the outer plug end for rotating the plug and having an enlarged inner end providing a shoulder engaging the cylinder base interior wall, said plug inner end having internal high lead threads formed therein, a high lead screw having one end threadedly engaging said plug inner end high lead threads and the other end extending toward said piston and formed to provide a cam, a split multi-section spline plate having exterior spline teeth thereon and receiving said cam centrally thereof and having cooperative cam surfaces engaging said cam so that rotation of said cam in one direction will expand the multiple sections of said spline plate radially outward, said spline plate having spring means joining the spline plate multiple sections and urging them radially inward, and interior spline teeth on said piston accommodating said spline plate exterior teeth in meshing relation when said spline plate multiple sections are moved radially outward, and being disengaged when said cam is rotated in the other direction so that said spline plate multiple sections move radially inward, said cam being rotated in said one direction by rotary movement of said plug until said spline teeth are engaged, with further rotary movement of said plug in said one direction imparting linear motion to said piston through action of said screw threads to mechanically apply the disc brake.

* * * * *